Patented Sept. 15, 1925.

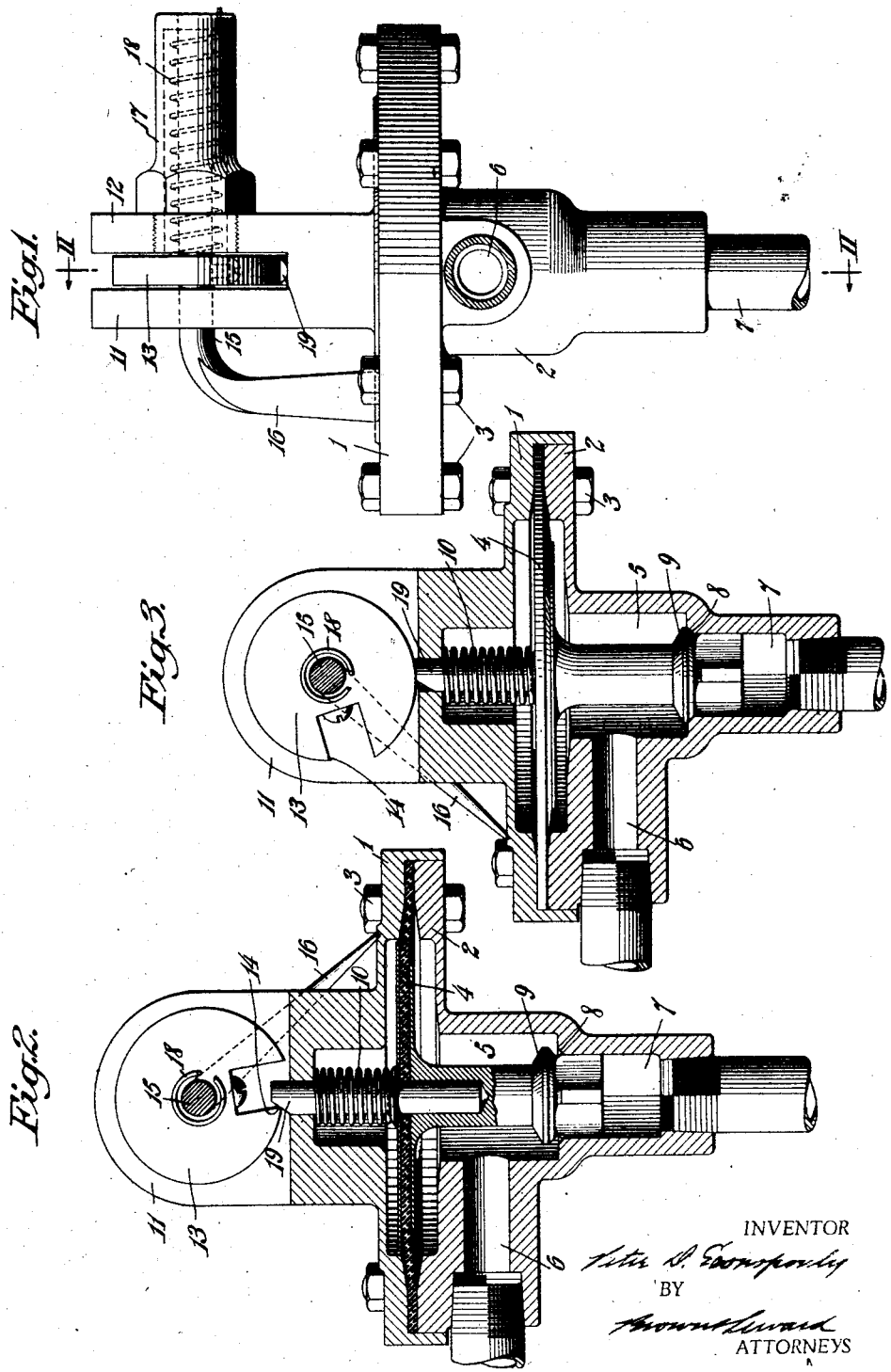

1,553,806

UNITED STATES PATENT OFFICE.

PETER D. ECONOPOULY, OF PORT JEFFERSON, NEW YORK.

AUTOMATIC CUT-OFF FOR PRESSURE-FLUID SUPPLY LINES.

Application filed February 21, 1923. Serial No. 620,454.

*To all whom it may concern:*

Be it known that I, PETER D. ECONOPOULY, a citizen of the United States, and resident of Port Jefferson, in the county of Suffolk and State of New York, have invented a new and useful Improvement in Automatic Cut-Offs for Pressure-Fluid Supply Lines, of which the following is a specification.

My invention relates to automatic cut-offs for pressure fluid supply lines and is more especially designed for gas supply lines where it is of great importance that the flow of gas be automatically cut-off when, from any cause the pressure in the gas supply line falls below a predetermined point, as for instance, by a break or other leak in the line.

My invention includes an automatic device for locking the cut-off valve closed until the valve is intentionally released by the manual resetting of the said automatic device.

My invention also comprises certain improvements in the construction, form and arrangement of the several parts of the cut-off as will hereinafter appear.

A practical embodiment of my invention is represented in the accompanying drawings, in which Fig. 1 represents the cut-off device in side elevation with the parts in the positions they assume when the cut-off valve is open and the pressure is normal.

Fig. 2 represents a section taken in the plane of the line II—II of Fig. 1.

Fig. 3 represents a detail similar section with the parts in the positions they assume when the pressure has fallen to a predetermined point and the cut-off valve is closed and locked in its closed position.

The cut-off casing in the present instance comprises the two members 1 and 2 arranged to clamp between them with a fluid tight joint by an annular series of bolts 3, the periphery of a flexible diaphragm 4 which forms the movable wall of a fluid pressure chamber 5 having suitable inlet and outlet ports 6 and 7. The port 7 is shown arranged centrally with respect to the diaphragm 4 and as having a seat 8 for the cut-off valve 9, carried by the said diaphragm. The cut-off valve 9 is held open by the fluid pressure acting on the diaphragm to move it to the limit of its movement in one direction. A spring 10 is located within the cut-off casing on the opposite side of the diaphragm 4 in position to act upon the diaphragm to move it to close the cut-off valve 9 when the fluid pressure in the supply line falls to a predetermined point from any cause upon either side of the cut-off.

I have provided a manually "set" automatic means for locking the cut-off valve in its closed position until intentionally released, which means in the present instance I have shown as comprising the following elements.

The member 1 of the casing is provided with lugs 11 and 12 between which is rotatably mounted a cam 13 having a shoulder 14 at its periphery. The end of the cam shaft 15 which projects beyond the lug 11 is provided with a suitable handle 16 for setting the cam, and the other end of the cam shaft 15 extends into a housing 17 projecting from the lug 12, within which housing I locate a spring 18 arranged to rotate the cam when it is released from its "set" position until the cam is stopped by the engagement of the free end of the handle 16 with the casing member 1.

A pin 19 projects centrally from the diaphragm 4 in the opposite direction to and in alinement with the cut-off valve 9, which pin extends through the casing member 1 into the path of the rotary cam 13.

I will suppose the parts to be in the positions they assume when the fluid pressure is acting on the diaphragm to hold the cut-off valve open and to hold the free end of the pin 19 in engagement with the shoulder 14 of the cam 13 to hold the cam in its "set" position. When the fluid pressure falls to a predetermined point because of breakage, leakage, or other conditions on either side of the cut-off, the spring 10 will act on the diaphragm 4 to move it in a direction to close the cut-off valve 9 and at the same time to draw the free end of the pin 19 out of engagement with the shoulder 14 of the cam 13, thus permitting the spring 18 to rotate the cam to bring its raised cam surface against the outer end of the pin to hold it against movement and to thereby lock the cut-off valve closed until intentionally released.

When it is desired to permit the cut-off valve to re-open the supply line and to reset the locking cam, the cam handle is turned to rotate the cam against the tension of its actuating spring 18 until the pin 19 is forced outwardly by the action of fluid pressure on the diaphragm 4 to bring the free end of the pin into engagement with the cam shoulder 14 for holding the cam in its "set" position ready to be again released by a drop in pressure in the supply line to the required extent.

It is evident that various changes may be resorted to in the construction, form and arrangement of the several parts without departing from the spirit and scope of my invention; hence, I do not wish to be limited to the particular embodiment herein shown and described, but

What I claim is:—

1. In an automatic cut-off for pressure fluid supply lines, a hollow casing having upper and lower members, said upper member being provided with lugs, a diaphragm secured between said members, a spring actuated valve carried by said diaphragm and held open by fluid pressure acting directly on the diaphragm, a pin uprising from the diaphragm and extending between the lugs of the upper member, a shaft journaled in the lugs and projecting outwardly from one lug, a cam fixed on said shaft between the lugs in position to engage the pin, a housing secured to the lug to protect the extending end of the shaft, and a spring located in said housing for actuating said cam and pin to close the valve.

2. In an automatic cut-off for pressure fluid supply lines, a hollow casing having upper and lower members, said upper member being provided with lugs, a diaphragm secured between said members, a spring actuated valve carried by said diaphragm and held open by fluid pressure acting directly on the diaphragm, a pin uprising from the diaphragm and extending between the lugs of the upper member, a shaft journaled in the lugs and projecting outwardly from one lug, a cam fixed on said shaft between the lugs in position to engage the pin, a housing secured to the lug to protect the extended end of the shaft, and a spring located in said housing for rotating said cam in one direction to engage the pin and close the valve.

3. In an automatic cut-off for pressure fluid supply lines, a hollow casing having upper and lower members, said upper member being provided with lugs, a diaphragm secured between said members, a spring actuated valve carried by said diaphragm and held open by fluid pressure acting directly on the diaphragm, a pin uprising from the diaphragm and extending between the lugs of the upper member, a shaft journaled in the lugs, one end of said shaft being provided with a handle for rotating the shaft in one direction and the other end projecting outwardly from one lug, a cam fixed on said shaft between the lugs in position to engage the pin, a housing secured to the lug to protect the extended end of the shaft, and a spring located in said housing for rotating said cam and shaft in the other direction to cause the cam to engage the pin and close the valve.

4. In an automatic cut-off for pressure fluid supply lines, a hollow casing having upper and lower members, said upper member being provided with lugs, a diaphragm secured between said members, a spring actuated valve carried by said diaphragm and held open by fluid pressure acting directly on the diaphragm, a pin provided with a beveled portion uprising from the diaphragm and extending between the lugs of the upper member, a shaft journaled in the lugs, one end of said shaft being provided with a handle for rotating the shaft in one direction and the other end projecting outwardly from one lug, a cam having a shoulder, said cam being fixed on said shaft between the lugs in position to engage the beveled portion of the pin, a housing secured to the lug to protect the extended end of the shaft, and a spring located in said housing for rotating said cam and shaft in the other direction to cause the cam to engage the pin and close the valve.

In testimony that I claim the foregoing as my invention, I have signed my name this 17th day of February 1923.

PETER D. ECONOPOULY.